United States Patent [19]
Larrow et al.

[11] Patent Number: 6,063,501
[45] Date of Patent: May 16, 2000

[54] SOLVENT RESISTANT REFINISH PAINT COMPOSITION AND METHOD OF APPLYING SAME

[75] Inventors: Douglas H. Larrow, Temperance, Mich.; Lawrence E. Thieben, Waterville, Ohio

[73] Assignee: BASF Corporation, Mt. Olive, N.J.

[21] Appl. No.: 08/042,899

[22] Filed: Apr. 5, 1993

Related U.S. Application Data

[63] Continuation of application No. 07/799,928, Nov. 26, 1991, abandoned, which is a continuation of application No. 07/474,260, Feb. 5, 1990, abandoned, which is a continuation of application No. 07/168,453, Mar. 15, 1988, abandoned.

[51] Int. Cl.[7] ............................... B32B 15/08; C08F 9/00; C08L 37/00
[52] U.S. Cl. ............................ 428/461; 428/463; 428/520; 523/201; 524/517
[58] Field of Search ................................ 523/201; 524/517; 428/461, 463, 520

[56] References Cited

U.S. PATENT DOCUMENTS

| | | |
|---|---|---|
| 3,876,603 | 4/1975 | Makhlouf ........................ 523/210 |
| 4,220,679 | 9/1980 | Backhouse . |
| 4,290,932 | 9/1981 | Wright et al. . |
| 4,377,661 | 3/1983 | Wright et al. . |
| 4,403,003 | 9/1983 | Backhouse . |
| 4,414,357 | 11/1983 | Wright et al. . |
| 4,477,536 | 10/1984 | Wright et al. . |

*Primary Examiner*—Peter D. Mulcahy
*Attorney, Agent, or Firm*—Kenyon & Kenyon

[57] ABSTRACT

Air-dry refinish primer compositions containing microparticles have been found to exhibit superior air-dry properties as well as being resistant to solvent attack when a primer-surfacer or topcoat is applied after a short (30 minute or less) dry time of the primer composition.

19 Claims, No Drawings

SOLVENT RESISTANT REFINISH PAINT COMPOSITION AND METHOD OF APPLYING SAME

This is a continuation of Ser. No. 07/799,928 filed Nov. 26, 1991, now abandoned itself a continuation of Ser. No. 07/474,260 filed Feb. 5, 1990, now abandoned itself a continuation of Ser. No. 07/168,453 filed Mar. 15, 1988, now abandoned.

FIELD OF THE INVENTION

This invention relates to storage-stable, oxidatively-curable refinish primer compositions. More particularly, this invention relates to a refinish primer composition containing microparticles. In its uncured state, a coating produced from this composition resists disruption by overlaid solvent-based primer surfacers.

BACKGROUND OF THE INVENTION

Refinish primers for repair of damaged coatings of paint are known and used particularly in the automotive industry. After the damaged paint is removed, such primers are ordinarily applied over the exposed bare metal or plastic substrate. They provide intercoat adhesion between the substrate and the decorative/protective top coat and protect the substrate from corrosive substances in the environment. Since heat sensitive parts are usually present, the primers must develop these characteristics without being thermally cured.

Although the traditional refinish primers on the market are adherent to some degree and "cure without heat", they have always poorly resisted solvent attack from organic solvent based overcoats. For today's refinish primers, this has become especially problematic. Refinishers seek formulations having low amounts of solvent so that they can satisfy environmental regulations. In attempting to meet these goals, paint researchers have lowered the molecular weight of the resins present. This change, however, has aggravated the already poor solvent resistance of such formulations. Thus, those refinish primers made for example with air-curable or thermocurable alkyds, epoxy esters, acrylics, melamines, silianes, oil-modified urethanes, nitrocellulose (particularly low molecular weight polymers), two-pack urethanes, and two-pack epoxys often swell, split or distort when overlay coatings are applied.

Microparticles and other materials such as cellulose acetate butyrate have been known since the early 1960's as a means for increasing solids content and for avoiding solvent strike-in in factory applied thermosetting coatings. In these applications, desirable surface characteristics are developed because the thermal treatment melts the microparticles or other weight adding material and smooths the coating surface. Use of microparticles in refinish applications, however, has been avoided for this reason. Refinish paints cannot be heat treated. As a result, a refinish paint formulated with microparticles, microgels or high weight dispersion polymers will have a grainy undesirable appearance owing to lack of thermal smoothing.

Therefore, it is an object of the invention to develop a refinish primer composition with microparticles that can be easily smoothed without heat. Another object is the development of a composition that resists attack of weak and strong organic solvents in the uncured state. A further object is development of a refinish primer and its combination with surfacer that can be worked and handled before they have cured. Other objects include development of a refinish primer composition that minimizes the amount of solvent present and can be effectively smoothed in the uncured state without heat treatment.

SUMMARY OF THE INVENTION

These and other objects are achieved by the present invention which is directed to a refinish primer composition containing microparticles. The composition is composed of an organic solvent system, an oxidatively-curable resin, and crosslinked acrylic polymer microparticles of diameter 0.1 to 10 microns which are insoluble in the organic solvent system but are stably dispersed therein by steric barriers. The composition can also contain a corrosion inhibitor, inert fillers and colored pigments. The resin is any polymeric material having olefinic groups which will oxidatively couple. The microparticles are composed of polymers of (meth) acrylate. esters, (meth) acrylic acids and glycidyl (meth) acrylates and its steric barriers are composed of polymeric chains having segments which are insoluble and soluble in the organic solvent system.

The invention is also directed to a method for producing a refinish primer system that can be worked in an uncured state. This method includes the steps of:

(a) applying to a bare substrate surface the foregoing refinish primer composition to form a protective layer; and (b) applying to the protective layer a primer surfacer composed of an organic solvent system, an oxidatively curable or plastic resin and an inert filler to form the refinish primer system.

According to this method, the primer surfacer can be laid directly onto the uncured protective layer and the resulting primer system can be immediately worked by sanding, buffing or carving. There is no need to wait until the primer system has cured.

The invention is as well directed to a primer system on a substrate surface which is composed of a layer of the foregoing refinish primer composition and an overlaying layer of the foregoing primer surfacer. The refinish primer system is produced according to the foregoing method.

DETAILED DESCRIPTION OF THE INVENTION

Under usual refinish operations, a primer coating protects the underlying substrate surface (usually metal) and builds up a volume of solids on the surface being refinished. The present refinish primer system possesses both of these characteristics but, in addition, can be worked in an uncured state.

These properties are achieved, in part, through the presence of microparticles in the refinish primer composition which forms the underlying layer of the present primer system. The refinish primer composition is an organic solvent based dispersion having a solids content in the range of from about 45 to about 70 percent, preferably 50 to 60 percent. The solids in the refinish primer composition include from about 10 to about 50 percent, preferrably from about 20 to about 40 percent, and especially about 25–30 percent microparticles; from about 30 to about 60 percent, preferrably about 40 to about 50 percent, and especially about 44–48 percent oxidatively curable resin, and about 15 to about 40 percent, preferrably about 20 to 35 percent, and especially about 25 to 35 percent corrosion inhibitor. The weight range for inhibitor can also include inert fillers, pigment and surface builders if present.

The organic solvent system of the refinish primer composition is composed of aprotic solvents or mixtures thereof including aromatic hydrocarbons such as toluene, xylenes, and mesitylenes, as well as more polar solvents such as aliphatic ketones and esters.

The oxidatively curable resin of the primer refinish composition constitutes any polymeric or enamel material that has free-radical oxidizable olefinic groups and is soluble in the solvent system. Generally such resins are alkyd resins, oil-modified alkyd resins, epoxy-unsaturated fatty acid ester resins, and addition or condensation resins with pendent olefinic groups. The addition and condensation resins include polyesters, polyurethanes, polyamides, polylactones, polycarbonates and polyolefins. Cationic metal organic salts can be added with the resin to catalyze its drying (oxidative cure). These oxidatively-curable resins, enamels and methods for their making are generally known in the art.

The microparticles of the refinish primer composition are associated with dispersion stabilizing polymers which form the surrounding steric barriers. These stabilizing polymers contain segments of differing polarity. At least one segment is soluble in the organic solvent and at least one other is substantially insoluble therein. The insoluble segment associates with the surface of the microparticle. In a preferred embodiment, this insoluble segment is chemically bound to the microparticle. In particular, preferred microparticles are based upon crosslinked polymers of methyl (meth) acrylate, (meth) acrylic acid and glycidyl (meth) acrylate with steric barriers of the adduct of self-condensed 12-hydroxy stearic acid and glycidyl (meth) acrylate which is copolymerized with methyl (meth) acrylate and (meth) acrylic acid. Such microparticles and methods for their making are known.

The corrosion inhibitor of the refinish primer composition is an inorganic salt or mineral having a reducing potential with respect to an underlying metal surface or an antioxidant potential with respect to an underlying plastic surface. For iron, these include zinc and strontium, lead and calcium salts and the like such as zinc salts of the aforementioned metals with chromates, phosphates, phosphites, metabonate and silicates. Preferred salts are the zinc phosphates.

Additional ingredients in the refinish primer composition include colored organic pigments and dyes such as indole dyes, and aromatic pigments, inorganic pigments such as titanium dioxide, magnesium silicate and the like, and clays, builders and fillers such as bentonite or kaolin clays, zeolites, fumed silicas, inorganic carbonates and the like.

In an embodiment of the refinish primer composition, the resin used is dissolved in aromatic hydrocarbon. Organic solvents including isobutyl acetate and xylene can be used to reduce the viscosity of the composition. The pigments are then added so as to constitute about 20 to 35 percent by weight of the resultant dispersion. Pigments or fillers known in the art such as organic dyes and lakes as well as metallic oxides, metalo-organics, carbon blacks, talc, clays, and the like may be used.

This resin-pigment dispersion is further combined with the foregoing especially preferred microparticles in an amount constituting about 20 to 40 percent of the solids.

Metal driers (i.e, catalysts for oxidative curing) are added to this dispersion. Any metal drier that is known in the art such as cobalt, zinc, zirconium, tin or calcium naphthanate, neodecanoate, or octoate and the like may be used. The use of a particular drier or driers is dependent on the type of drying mechanism of the primary coating resin.

The balance of this embodiment includes solvent for adjustment of the viscosity. A preferred solvent is xylene.

The primer surfacer used according to the invention produces the overlaid layer of the primer system. It primarily delivers the inert fillers and resin for building the surface being refinished, and for filling cavities and voids therein. The primer surfacer is composed of an oxidatively curable or plastic resin, inert fillers and pigments and a strong organic solvent system.

The resin of the surfacer includes those oxidatively curable resins (enamels) mentioned above as well as lacquer (plastic) resins such as poly (acrylic esters), cellulose esters such as nitrocellulose and phthalate polyesters. These enamels and lacquers are known in the art. See, for example, U.S. Pat. Nos. 4,362,770; 4,529,765; 4,539,360 and 4,725,640.

The inert fillers and pigments in the surfacer include bentonite and kaolin clays, inorganic carbonates, silicates and oxides, fumed silica, zeolites, sodium alumino silicates, minerals such as mica, iron oxide, carbon blacks, talcs and the like. These ingredients add body to the surfacer layer and permit working to smoothness. Usually, the fillers are combined with an emulsifier (nonionic or anionic surfactants) or stabilizer system to prevent their settling. Such stabilizers include soya lecithin and the like.

The organic solvent system of the surfacer is highly polar. Generally useful solvents include aliphatic ketones, esters, alcohols and mixtures thereof as well as small amounts, of water. According to the invention, this strong solvent system will carry a high percentage of solids in the primer surfacer without developing high viscosity or settling difficulties.

According to the method of the invention for preparing the refinish primer system, the layer of the refinish primer composition is applied directly to a bare, clean substrate such as a metal or plastic automotive vehicle body. Spraying, dipping, brush flow coating and the like to a thickness of about 0.2 to 2.5 mils are the typical application techniques employed. For convenience in spraying, the refinish primer composition can be diluted approximately 50 to 100 percent by volume with additional organic solvent system. Multiple passes of the application apparatus may be required to build such thicknesses.

Following a typical flash dry time of about 30 minutes or until the protective layer is tacky, the primer surfacer can be applied by a similar technique. An additional short time, about 5 minutes to 15 minutes, is thereafter sufficient to render the two layer refinish primer system dry to the touch. Although the protective layer at this point is uncured, the overlaid, primer surfacer layer can be smoothed by buffing, sanding or otherwise working. After smoothing, a decorative top coat can be applied as is standard in the art. Such topcoats include acrylic and cellulosic lacquers, unsaturated polyesters and acrylics, urethanes, acrylic enamels and oxirane and aziridine.

The microparticles of the refinish primer composition generate a higher solids content than is typical of known refinish primer paints. Immediate overcoating with primer surfacer will not substantially disrupt the protective layer produced according to the invention. Largely because of the microparticles, the protective layer resists and/or absorbs solvent strike-in from the overlaid surfacer.

The novel, solvent resistance of the protective layer permits the use of organic solvents in the primer surfacer that have a high solvating capacity. Such solvents and/or their proportions would disrupt heretofore known primer paints. This high solvating capacity also enables the primer surfacer to carry a high percent of filler solids without risk of agglomeration and/or settling.

Microparticles have been used in factory applied, thermosetting coatings. While these coatings are rough when applied owing to the grainy microparticles, their hardening by heat partially melts the microparticles and smooths the coating surface.

The roughness of the primer system surface according to the present invention cannot be handled by thermal treatment. Refinishing operations must avoid use of heat since plastic parts in the assembled machine or auto would be adversely affected. Although such roughness is ordinarily handled by sanding, ordinary refinish paints are difficult or impossible to work until fully cured. Consequently, sanding is ordinarily a last step performed after curing. When cured, however, these paints are tough and resist efforts to smooth through sanding or buffing.

According to the invention, the strong, adherent, two layer primer system alleviates these difficulties. It can be easily smoothed in its uncured state so that the roughness of the protective layer can be eliminated before overlay coats are applied. Working does not damage the two layer primer system of the invention since in its uncured state, the microparticles, the high concentration of inert fillers and pigment, and the strong adherence between the two layers produced by strong solvent-resin interaction at the layer interface contribute strength and resilience to the system.

PREPARATION A

(i) Preparation of Stabilizer

The dispersion stabilizer used to form as the steric barriers of the microparticles was produced as follows: 12-Hydroxystearic acid was self-condensed to an acid value of about 35 mg KOH/g (corresponding to a molecular weight of 1700–1850) and then reacted with an equivalent amount of glycidyl methacylate. The resulting unsaturated ester was copolymerized at a weight ratio of 2:1 with a mixture of methyl methacrylate and acrylic acid in the proportions of 95:5.

(ii) Preparation of Microparticles With Steric Barrier

The following ingredients were combined in a mixing flask:

| | |
|---|---|
| Petroleum Ether Solvent (bp 130–150° C.) | 20 parts |
| Methyl Methacrylate | 2 parts |
| Methacrylic Acid | 0.04 part |
| Dispersion Stabilizer Polymer (i) | 0.5 part |
| Free Radical Initiator (azo compound) | 0.2 part |

The resulting mixture was flushed with dry nitrogen and the temperature raised to about 110° C. After approximately 1 to 1½ hrs. the following monomers were added dropwise to the hot polymerizing mixture.

| | |
|---|---|
| Methyl Methacrylate | 33 parts |
| Glycidyl Methacrylate | 0.4 part |
| Methacrylic Acid | 0.4 part |
| Free Radical Initiator | 0.2 part |
| Dispersion Stabilizer Polymer (i) | 7.0 parts |
| Petroleum Ether | 34 parts |

The contents of the vessel were mixed at 100° C. for a further 4 hours, to give complete polymerization of the monomers to a fine dispersion containing insoluble polymer i.e. microparticles stabilized with steric barriers.

PREPARATION B

Preparation of Epoxy-Fatty Acid Ester

In a reflux flask equipped with stirrer, inert gas inlet and a water separator, are mixed 1 kg. of xylene, 0.5 kg of a $C_{12}$ to $C_{18}$ unsaturated fatty acid, and 1.5 kg of liquified bisphenol A epoxy resin having a molecular weight of about 2000–3000 (adduct of bis-phenol A and the diglycidylether thereof). To this refluxing mixture is added dropwise about 0.7 kg isophthalic acid and 10 g. toluenesulfonic acid in 0.25 kg xylene. The mixture is refluxed about 3 hours with water separation or until an acid number of about 2 is reached. The xylene is then removed by vacuum distillation and the polyepoxy-ester residue diluted to about 50 percent solids with a mixture of 5:2:1 naphtha, butyl alcohol and butyl acetate.

PREPARATION C

Preparation of Primer Surfacer

(i) Preparation of Polyacrylate Lacquer

To a reflux flask equipped with a condensor and, a heat source is added about 9.6 kg toluene solvent. To a drip flask attached to the reflux flask are added the following monomers: 5.7 kg methyl methacrylate, 6.3 kg butyl methacrylate, 0.2 kg methacrylic acid, 0.5 kg hydroxyethyl methacrylat.e and 0.05 kg free radical initiator (azo compound). The solvent is brought to reflux and then the monomer mixture is slowly added dropwise with agitation. After about 2 hours, an addition free radical catalyst (peroxide) in toluene is added and the mixture refluxed an additional 2 hours.

The solvent is then removed by vacuum distillation and the lacquer polymer redissolved in a 60:20:20 mixture of ethyl acetate, methyl isoamyl ketone and isopropanol to form a solution having about a 55% by weight solids content.

(ii) Preparation of Translucent Surfacer

A tranlucent primer surfacer may be prepared by combining about 60 kg of the lacquer solution of part (i), 20 kg talc having a particle size of from 0.1 to 10 microns, 20 kg of fused silica of particle size 0,1 to 50 microns, 2 kg powdered bentonite clay and 15 kg methyl ethyl ketone, 15 kg aliphatic naphtha. Optionally about 1 kg of a polyoxyethylenated sorbitan monopalmitate emulsifier can be added as a stabilizer.

(iii) Preparation of a White Primer Surfacer

To about 100 kg of the Surfacer of part (ii) is added 5 kg titanium dioxide pigment to form a white surfacer.

| PREPARATION D | |
|---|---|
| Nitrocellulose Primer Surfacer | |
| Material | Pounds |
| Synthetic iron oxide, black | 100 |
| Titanium dioxide | 10 |
| Barytes | 200 |
| Talc | 200 |
| Aluminum silicate | 50 |
| Modified soya alkyd resin | 200 |
| Butyl acetate | 65 |

-continued

PREPARATION D
Nitrocellulose Primer Surfacer

| Material | Pounds |
| --- | --- |
| Ethyl alcohol | 40 |
| Toluene | 65 |

Disperse above ingredients on a Cowles high-speed disperser until a uniform consistency is produced. Then further disperse on a sand mill to a grind reading of 20 to 30 microns. Then add the following with agitation:

| | |
| --- | --- |
| Half-second nitrocellulose | 100 |
| Butyl acetate | 65 |
| Ethyl alcohol | 35 |
| Toluene | 65 |
| Tricresyl phosphate | 30 |
| Weight per gallon | 11.9 lbs. |
| Pigment weight | 45.6% |

The viscosity of this primer-surfacer should be further reduced for spraying with a lacquer thinner. The reduction should be 1:1 by volume with a solvent blend of the following:

| Material | Percent by Volume |
| --- | --- |
| Isopropyl alcohol | 20 |
| V.M. & P. Naphtha | 20 |
| Toluene | 20 |
| Butyl acetate | 20 |
| Acetone | 20 |
| | 100 |

EXAMPLE 1

Refinish Primer Composition

With good stirring 815.0 g. of a 50% solution of epoxy ester resin prepared according to Preparation B in naptha and isobutyl alcohol is mixed with 299.0 g. isobutyl acetate. Thereafter is added 16.3 g. of sifted Bentone 34 clays. To this stirring mixture are added the following: 16.38 g. Isoindolinone pigment (Harmon Y5775), 1.11 g. Phthalo Green pigment (Chemtron GT 4818), 42.41 g. Titanium Dioxide pigment (DuPont R-960), 125.0 g. Magnesium silicate pigment (Baker A-3), and 325.0 g. Zinc Phospho Oxide complex pigment (NL Chemicals, NALZIN SC-2). When the mixture is thoroughly combined, it is passed through a Sussmeyer vertical mill until its grind fineness is 30 microns or finer. To this paste is added the following ingredients with continuous stirring: 433.0 g. Microgel resin dispersion prepared according to Preparation A 185.4 g. Xylene, 1.72 g. MEK oxime (Nuodex, ExkiLn #2), 3.38 g. 18% Zirconium Neodecanoate, 1.97 g. 6% Manganese Neodecanoate and 2.02 g. 12% Cobalt Neodecanoate. The resulting mixture is concentrated refinish primer composition.

The primer composition is set to a spray viscosity of 11 to 15 sec. in a #4 Ford cup by diluting with acetone, aliphatic naphtha and toluene in a ratio of 30:50:20.

Bare steel panels are spray-coated with the diluted refinish primer composition. Two light, even coats are applied. A dry film thickness of 0.2 to 0.4 mils resulted. The coated panels are allowed to air dry 30 minutes then the primer-surfacer of Preparation D is applied in three coats to a film thickness of 2.0 to 2.5 mils. Alternatively, the primary surfacer of Preparation C can also be used in this application.

COMPARATIVE EXAMPLE 2

A comparative example of a zinc phospho oxide primer free of microparticles is prepared as follows.

With good stirring, 1,185 g. of a 50% solids solution of epoxy ester resin prepared according to Preparation B in naphtha and butyl alcohol is mixed with 310 g. isobutyl acetate. Thereafter is added 20 g. of sifted, particulate Bentone 34 clay. To this stirring mixture are added the following: 16.38 g. Isoindolinone pigment (Harmon Y5775), 1.11 g. Phthalo Green pigment (Chemtron GT 4818), 42.41 g. Titanium Dioxide pigment (DuPont R-960), 125.0 g. Magnesium Silicate pigment (Baker A-3), and 325.0 g. Zinc Phospho Oxide complex pigment (NL Chemicals, NALZIN SC-2). When the mixture is thoroughly combined, it is passed through a Sussmeyer vertical mill until its grind fineness is 30 microns or finer. To this paste is added the following ingredients with continuous stirring: 487.64 g. Xylene, 1.82 g. MEK oxime (Nuodex, Exkin #2), 3.41 g. 18% Zirconium Neodecanoate, 1.98 g. 6% Manganese Neodecanoate and 1.98 g. 12% Cobalt Neodecanoate. The resulting mixture is a concentrated primer mixture.

The primer mixture is set to a spray viscosity of 11 to 15 sec. in a #4 Ford cup by diluting with acetone, aliphatic naphtha and toluene at a ratio of 30:50:20, Bare steel panels are spray-coated with the diluted primer mixture. Two light, even coats are applied. A dry film thickness of 0.2 to 0.4 mils resulted. The coated panels are allowed to air dry 30 minutes then the primer-surfacer of Preparation D is applied in three coats to a film thickness of 2.0 to 2.5 mils.

EXAMPLE 3

SOLVENT RESISTANCE TEST

Preparation

About 0.2–0.4 mils of the coating composition is applied to a flat bare steel panel. The coating is allowed to air-dry 30 minutes, then 2.0–2.5 mils of lacquer type primer-surfacer is applied. The testing is started as soon as the primer-surfacer has become tack-free.

Method of Testing

A 500 gram weight is put onto the paddle. The paddle with the weight is then given a twist so that the pad surface on the panel is rotated 90 degrees. The completion of this test should take 1–2 second. The paddle and weight are then removed and the coating examined.

Observations

The coating is examined for any ripping or tearing with the naked eye. If the coating surface is torn or peels to expose the underlying coating, then the result is classified as a failure. If, on the other hand, the coating shows no tearing then the result is a pass.

To estimate solvent resistance the members of a group of panels coated with the same primer are sequentially tested so that succeeding members tested will have a longer time to dry. The length of time required to obtain a pass indicates the solvent resistance of the coating, a long time correlating to low solvent resistance.

RESULTS FROM USING SOLVENT RESISTANCE TEST

| Coating Composition | Time (minutes) | | | | | |
|---|---|---|---|---|---|---|
| | 5 | 15 | 25 | 35 | 50 | 70 |
| Example 1 | Fail | Fail | Pass | Pass | Pass | Pass |
| Comparative Example 2 | Fail | Fail | Fail | Fail | Fail | Pass |

We claim:

1. A refinish primer system comprising a first layer of refinish primer composition and a second layer of primer surfacer composition;
    said refinish primer composition comprising:
        an organic solvent based dispersion having a solids content in the range from about 45 to 70%, by weight, wherein said organic solvent is selected from the group consisting of: aprotic solvents or mixtures thereof;
        and wherein said solids comprise:
            from about 10 to about 50%, by weight, crosslinked acrylic polymer microparticles having a diameter of 0.1 to 10 microns which are insoluble in the organic solvent and are stabilized in the solvent system by steric barriers;
            from about 30 to about 60%, by weight, an oxidatively-curable resin;
            from about 15 to about 40%, by weight, one or more ingredients, selected from the group consisting of: corrosion inhibitors, inert fillers, pigments, surface builders and mixtures thereof;
    and said primer surfacer composition comprising:
        an organic solvent system, and oxidatively curable or plastic resin, and an inert filler.

2. A refinish primer composition according to claim 1 further comprising a corrosion inhibitor.

3. A refinish primer composition according to claim 1 further comprising inert filler, colored pigment or a mixture thereof.

4. A refinish primer composition according to claim 1 wherein the microparticles are associated with dispersion stabilizing polymers which form the surrounding steric barriers, and contain at least two segments, one being soluble in the organic solvent and the other being substantially insoluble therein.

5. A refinish primer composition according to claim 4 wherein the dispersion stabilizing polymers are chemically bound to the microparticles.

6. A refinish primer composition according to claim 1 wherein the oxidatively-curable resin comprises an alkyd resin, an oil-modified acrylic resin, an epoxy-unsaturated fatty acid ester resin, or an addition or condensation resin with pendant olefinic groups.

7. A refinish primer composition according to claim 6 wherein the addition or condensation resin is a polyester, polyurethane, polyamide, polylactone, polycarbonate or polyolefin.

8. A refinish primer composition according to claim 2 wherein the corrosion inhibitor is a zinc salt.

9. A refinish primer composition according to claim 8 wherein the zinc salt is zinc phosphate.

10. A refinish primer composition according to claim 1 wherein the organic solvent system has nonpolar solvating power.

11. A refinish primer composition according to claim 10 wherein the solvent system comprises an aromatic hydrocarbon, an aliphatic ketone, an aliphatic ester or a mixture thereof.

12. A refinish primer composition according to claim 1 wherein the microparticles are polymers of methyl acrylate or methacrylate, acrylic or methacrylic acid and glycidyl acrylate or methacrylate with surrounding steric barriers of the adduct of self-condensed 12-hydroxystearic acid and glycidyl acrylate or methacrylate, which adduct is copolymerized with methyl acrylate or methacrylate and acrylic or methacrylic acid.

13. A refinish primer composition according to claim 1 further comprising silica, bentonite or kaolin clay, zeolites, talcs, inorganic carbonate or silicate or mixtures thereof.

14. The refinish primer system of claim 1 wherein the solids content of said organic solvent based dispersion is 50 to 60 percent, by weight.

15. The refinish primer system of claim 1 wherein said solids comprise from about 20 to about 40%, by weight, the crosslinked acrylic polymer microparticles.

16. The refinish primer system of claim 1 wherein said solids comprise from about 40 to about 50%, by weight, the oxidatively-curable resin.

17. The refinish primer system of claim 1 wherein said solids comprise from about 20 to about 35%, by weight, one or more ingredients, selected from the group consisting of: corrosion inhibitors, inert fillers, pigments, surface builders and mixtures thereof.

18. The refinish primer system of claim 1 comprising:
    from about 20 to about 40%, by weight, the crosslinked acrylic polymer microparticles;
    from about 40 to about 50%, by weight, the oxidatively-curable resin; and
    from about 20 to about 35%, by weight, one or more ingredients, selected from the group consisting of: corrosion inhibitors, inert fillers, pigments, surface builders and mixtures thereof.

19. A refinish primer system comprising a first layer of refinish primer composition and a second layer of primer surfacer composition,
    said refinish primer composition comprising:
        an organic solvent based dispersion having a solids content in the range from about 45 to 70%, by weight, wherein said organic solvent is selected from the group consisting of: aprotic solvents or mixtures thereof;
        and wherein said solids comprise:
            from about 10 to about 50%, by weight, crosslinked acrylic polymer microparticles having a diameter of 0.1 to 10 microns which are insoluble in the organic solvent and are stabilized in the solvent system by steric barriers;
            from about 20 to about 40%, by weight, a resin-pigment dispersion comprising 20 to 35%, by weight, pigment, in an oxidatively-curable resin dissolved in aromatic hydrocarbon;
            from about 15 to about 40%, by weight, an ingredient, or ingredients, selected from the group consisting of: corrosion inhibitors, inert fillers, surface builders and mixtures thereof;
    and said primer surfacer composition comprising:
        an organic solvent system, and oxidatively curable or plastic resin, and an inert filler.

* * * * *